3,158,593
ALUMINUM CHLOROFLUORIDE POLYMERIZA-
TION CATALYSTS
John D. Calfee, Dayton, Ohio, assignor to Monsanto
Company, a corporation of Delaware
No Drawing. Filed Apr. 24, 1953, Ser. No. 730,542
5 Claims. (Cl. 260—94.9)

This invention relates to insoluble polymerization catalysts of the Friedel-Crafts type having high activity. Catalysts of this invention are of particular interest because they operate in a heterogeneous system and thus are not dependent upon a catalyst solvent for efficient activity.

This invention is directed to new compositions of matter comprising aluminum chlorofluorides having a fluoride content of about 9.7% by weight to about 72.8% by weight based on the total halide content of said aluminum chlorofluoride. Representative new compounds included within the scope of my present invention are aluminum dichlorofluoride, $AlCl_2F$, and aluminum chlorodifluoride, $AlClF_2$. Methods of preparing these new compositions depend upon the reaction of certain fluorine-containing compounds with a solution of $AlCl_3$ in an inert, non-complexing solvent.

This invention is further directed to the use of these aluminum chlorofluorides as catalysts for the polymerization of ethylenically unsaturated hydrocarbons and also for the polymerization of ethylenically unsaturated monohalo hydrocarbons to high molecular weight polymers and copolymers.

It is an object of this invention to prepare an effective catalyst for the polymerization of ethylene to solid high molecular weight polymer. Another object of this invention is to obtain a catalyst system having high activity in polymerizing various unsaturated hydrocarbons to high molecular weight polymers.

Investigators studying the use of Friedel-Crafts catalysts in ethylene polymerization reactions observed that low molecular weight oils were generally obtained. This has been explained by the theory that side reactions took place concurrently with the build up of the polymer chain. Thus, hydrogenation-dehydrogenation of the polymer molecule occurred along with polymerization. In addition, polymer olefins are subject to cyclization, intramolecular alkylation, and isomerization. The overall phenomenon (polymerization conjoined with hydrogen disproportionation) is recognized as "conjunct polymerization," and has been described by Ipatieff and Gross in the Journal of the American Chemical Society, vol. 58, page 915 (1936).

An additional object of my invention is to obtain catalysts that are effective in polymerizing ethylene to linear solid polymer without catalyzing conjunct polymerization.

Aluminum fluoride, without the promotional activity of the chloride constituent as taught in my invention, is not generally recognized as an active catalyst. In an article published in Chemical Reviews, vol. 17, pages 327–392 (1935), N. O. Calloway has tabulated the compounds, on page 375, that are considered as active Friedel-Crafts catalysts. Aluminum fluoride is not included as an active catalyst in this listing. Generally, $AlF_3$, is characterized as an inert polymerization catalyst and ineffective in preparing high molecular weight polymer.

It is well known that aluminum chloride is very active as a polymerization catalyst for ethylene at moderate temperatures and pressures. However, under polymerizing conditions, aluminum chloride catalyzes conjunct polymerization. Another object of this invention is to modify aluminum chloride to obtain a material retaining the excellent activity of aluminum chloride as a polymerization catalyst while suppressing or considerably reducing the activity of aluminum chloride as a catalyst for conjunct polymerization.

Early workers in this field demonstrated that conjunct polymerization could be controlled to a certain extent by reduction of temperature during reaction. H. I. Waterman and J. J. Leendentse studied olefin polymerization and reported in the Journal of the Institution of Petroleum Technologists, vol. 34, page 16 (1938), that when polymerizing ethylene at 125–150° C. with aluminum chloride catalyst under increased pressure considerable cyclization occurred. These investigators further reported that ethylene reacts very slowly at about room temperature and atmospheric pressure using aluminum chloride catalysts, but cyclization was found to occur at temperatures as low as −78° C.

It has previously been established (U.S. 1,745,028) that polymerization of ethylene can be carried out by passing gaseous ethylene through a suspension of aluminum chloride, dispersed in a hydrocarbon diluent. Only liquid products, i.e., low molecular weight polymers, were obtained by this procedure. The difficulties inherent in the method are that undesirable side reactions, occur at normal operating temperatures, while at low temperatures the polymerization is too slow to have practical interest for the preparation of high molecular weight solid polymer from ethylene.

Attempts have been made to avoid "conjunct polymerization" by the use of solvents for the olefin polymerization catalyst. Investigators have shown that at low temperatures the reaction of ethylene to produce polymerization products in the presence of solvents gave only low molecular weight oils. The reaction is characterized by a long reaction time, and sludge or catalyst complex formation.

Friedel-Crafts double salt catalysts have been prepared (described in U.S. 2,542,610) for the purpose of obtaining a soluble catalyst. However, the catalysts of my invention are designed to operate in a non-soluble or heterogeneous system.

Catalysts of my invention are the aluminum halides in which the halide portion of the molecule consists of combinations of chloride and fluoride ions. These materials are thus aluminum chlorofluorides. The following compositions are representative embodiments of my invention:

$AlCl_3 \cdot AlCl_2F$             $AlCl_2F \cdot AlF_3$
$AlCl_3 \cdot AlClF_2$             $AlClF_2 \cdot AlF_3$
$AlCl_3 \cdot AlF_3$ It is understood that these compositions, although written as double salts may exist as single molecules such as $Al_2Cl_5F$, $Al_2Cl_3F_3$, $Al_2ClF_5$, $AlCl_2F$ and $AlClF_2$. This invention is not to be limited, however, by any theory of the chemical structure of these compositions.

The aluminum chlorofluoride catalysts of my invention can be prepared by the reaction of certain fluorine-containing compounds with anhydrous aluminum chloride. I prefer to use a volatile non-complexing solvent for the aluminum chloride; methyl chloride and ethyl chloride are excellent examples of the desired solvent. Under anhydrous conditions, hydrogen fluoride, boron trifluoride, benzotrifluoride, $C_6H_5CF_3$, and ethylidene fluoride, $CH_3CHF_2$, have all been used successfully to convert $AlCl_3$ to the aluminum chlorofluorides of my invention.

In another embodiment of my invention, I have found it possible to prepare the aluminum chlorofluorides by fusing mixtures of aluminum chloride with aluminum trifluoride.

Since the catalysts obtained in these methods of syntheses may be mixtures of aluminum chlorofluorides, I have found it convenient to further define these products by the percentage, by weight, of fluoride content, based on the total halide content of the catalyst. Some of the possible reaction products obtained from the reaction of a fluorinating agent, for example, ethylidene fluoride, with aluminum chloride are listed in Table I. It will be observed that the percent of fluoride based on the total halide content varies from 9.7% to 72.8%. I have found that aluminum chlorofluorides containing a fluoride content, based upon the total halide content, of 9.7% to 72.8% are operative as polymerization catalysts. I have found that either mixtures of these compounds or the pure compounds theselves are quite effective as olefin polymerization catalysts.

In referring to Table I, it will be appreciated that a mixture of molar quantities of $AlCl_2F$ and $AlClF_2$ will give a catalyst with the identical composition of $AlCl_3 \cdot AlF_3$. The five compositions listed in Table I are specific compositions of the catalysts of my invention and are written as double salts, or complex aluminum halides, for ease in describing these products. These catalysts of my invention are not simple mixtures of $AlCl_3$ and $AlF_3$ but complex molecules, homogeneous compositions bound by molecular attraction.

TABLE I

[All percentages expressed as weight percent]

| | Percent Al | Percent Cl | Percent F | Percent Halide Content | Percent F of total Halide Content |
|---|---|---|---|---|---|
| $AlCl_3 \cdot AlCl_2F$ ($Al_2Cl_5F$) | 21.6 | 70.8 | 7.6 | 78.4 | 9.7 |
| $AlCl_3 \cdot AlClF_2$ ($Al_2Cl_4F_2$) | 23.0 | 60.7 | 16.3 | 77.0 | 21.2 |
| $AlCl_3 \cdot AlF_3$ ($Al_2Cl_3F_3$) | 23.7 | 50.1 | 26.2 | 76.3 | 34.4 |
| $AlCl_2F \cdot AlF_3$ ($AlClF_2$) | 26.9 | 35.3 | 37.8 | 73.1 | 51.7 |
| $AlClF_2 \cdot AlF_3$ ($AlClF_5$) | 29.3 | 19.2 | 51.5 | 70.7 | 72.8 |

In my preferred method of preparing aluminum chlorofluoride, a fluoride-containing compound, for example, ethylidene fluoride, is slowly added to a solution of aluminum chloride in a lower alkyl chloride at temperatures below 0° C. As the reactants are then warmed to about 10° the reaction proceeds rapidly and the aluminum chlorofluoride is precipitated. The catalyst formed by this reaction is so finely divided, absorptive, and of such high surface area that a gel is formed. Removal of the solvent, and the by-product chloride-containing compound under reduced pressure leaves a dry free-flowing finely divided powder. Catalysts prepared by this procedure retain trace quantities of organic chlorides adsorbed on their surfaces. I have found that these materials have no seriously adverse effects on the activity of the catalysts although catalyst activity is enhanced by their removal.

The aluminum chlorofluoride compositions of my invention can be prepared at temperatures ranging from about −20° C. to about 150° C., preferably at 0° to 10° C., at atmospheric pressure; but, when the reaction of aluminum chloride, dissolved in an alkyl halide, is carried out in an autoclave with an organic fluorinating agent, the temperature of reaction can be as high as about 150° C. or higher. I prefer to use a reaction temperature of about 100° C. or preferably less than 75° C.

As a further embodiment of this invention the catalyst gel can be used as formed without evaporation of the alkyl halide solvent prior to transfer to the polymerization reaction. When the gel is added to an inert diluent the alkyl halide can optionally be evaporated after the gel is transferred.

I have found that the presence of moisture and unsaturated materials must be avoided in the reaction zone, when preparing these catalysts. Moisture has a detrimental effect, neutralizing the catalyst activity.

It is believed that the exceptional acivity of the aluminum chlorofluoride is due, at least in part, to the physical nature of the materials as prepared. As they precipitate from ethyl or methyl chloride solution in the formation step, they are in extremely finely divided form. As a result, they are porous and possess great surface areas, and actually appear amorphous when viewed with a high-powered optical microscope. Catalysts of my invention have been examined by X-ray diffraction technique, which reveals the presence of sub-microscopic crystals, known as "crystallites." These crystallites have a radius of about 500 Angstrom units and lower, as determined by the technique of X-ray diffraction line broadening. Crystallite size measurements have further been confirmed by electron microscopy.

Activity of the aluminum chlorofluorides as polymerization catalysts can be enhanced by certain added compounds, commonly called co-catalysts. The by-products formed in the reaction of the various fluorinating agents with aluminum chloride have been adsorbed on the catalyst surface in trace quantities. For example, when boron trifluoride reacted with aluminum chloride to form aluminum chlorofluorides, in accordance with the practice of my invention, about 0.7% boron has been determined to be present by the analysis of the aluminum chlorofluorides. The boron trichloride thus adsorbed has not deleterious effect but actually functions as a co-catalyst. In a similar manner, when anhydrous HF is used to convert aluminum chloride to aluminum chlorofluorides, according to my invention, trace quantities of HCl and HF that have been adsorbed on the catalyst surface function as co-catalysts.

When the fluorine source used to prepare the catalyst is an organic fluoride, e.g., ethylidene fluoride, benzotrifluoride, etc., trace quantities of organic halides are adsorbed on the catalyst surface. These materials are probably inert, as to co-catalyst activity; but, on the other hand, they do not seriously poison the catalyst. However, I have found that catalyst activity is enhanced by their removal.

Co-catalysts having pronounced activity in the polymerization reaction include many of the accepted Friedel-Crafts type compounds. I have demonstrated that the aluminum chlorofluorides can serve as the sole catalyst for the polymerization process of my invention; however, the catalyst activity may be further enhanced, if desired, by the addition of an active halide compound.

By active halide compounds, I mean the halide compounds known to have activity as Friedel-Crafts catalysts excepting the fluorine-containing Friedel-Crafts catalysts.

The mechanism of action of these compounds is not fully understood, but it has been described as a co-catalytic or activation effect. The reaction rate and conditions of temperature and pressure can be modified by the addition of one or more of these active halide compounds which serve as co-catalysts or activators in the polymerization systems. Typical examples of the applicable active halide compounds include antimony pentachloride, antimony trichloride, tin tetrachloride, titanium tetrachloride, titanium trichloride, silicon tetrachloride, ferric chloride, aluminum bromide, chromium trichloride, zirconium tetrachloride, and zinc chloride. I prefer to use about 1 part by weight of the aluminum chlorofluoride of this invention per 0.1 to 20 parts by weight of co-catalyst; however, this ratio can be varied widely according to the monomer used, and as the reaction conditions are changed.

Aluminum chlorofluorides have high activity in the polymerization of aliphatic monoolefins having a methylene group doubly-bonded to carbon. High molecular weight solid, linear polymer can be prepared from ethylene by the use of the catalysts of my invention. These catalyst compositions are also effective when used to polymerize propylene, butene-1, isobutylene, pentene-1, hexene-1, heptene-1, octene-1, nonene-1, decene-1, dodecene-1, and mixtures of these monomers, to high molecular weight polymers. These catalysts can be used to polymerize certain monohalo monomers to high molecular weight polymers, i.e., vinyl fluoride, and chloroprene.

As a further embodiment of my invention I have shown that aluminum chlorofluorides are effective as catalysts in the preparation of copolymers and can be used for polymerizing monoolefins with conjugated aliphatic diolefins. High molecular weight copolymers can be prepared by using the catalysts of my invention from isobutylene-isoprene, isobutylene-butadiene, isobutylene-chloroprene, propylene-isoprene, propylene-butadiene and ethylene-butadiene as typical examples. Copolymers can be prepared from bicycloheptadiene-isoprene and from bicycloheptadiene-butadiene by the use of aluminum chlorofluoride catalysts according to my invention.

I have found that the aluminum chlorofluorides are particularly effective in catalyzing the low-temperature polymerization of isobutylene. Copolymers prepared according to my invention from isobutylene-styrene, isobutylene-chloroprene, isobutylene-butadiene, and isobutylene-isoprene are of especial interest because of the applications of these copolymers as synthetic rubbers. These catalysts of my invention are effective catalysts from temperatures as low as $-100°$ C. and up to temperatures above about 100° C.

As further evidence of the versatility of the aluminum chlorofluorides of my invention as polymerization catalysts, I have used these new compositions to polymerize cyclopentene and also styrenes and to prepare copolymers from styrenes and other monomers. By the term styrenes I mean styrene and its chloro- and alkyl-ring-substituted derivatives, e.g., o-methylstyrene, p-methylstyrene, m-ethylstyrene, o-isopropylstyrene, p-butylstyrene, p-chlorostyrene, o-chloro-m-methylstyrene, p-chloro-o-methylstyrene, m-chloro-p-isopropylstyrene, etc. I have found that styrenes containing less than a total of about 13 carbon atoms are preferable for the preparation of polymers and copolymers by aluminum chlorofluoride catalysis.

In yet another embodiment of my invention I have shown that copolymers of high molecular weight can be prepared from ethylene-styrene, propylene-styrene, isobutylene-styrene, ethylene-p-chlorostyrene, propylene-o-chlorostyrene, isobutylene-p-chlorostyrene, isobutylene-m-chlorostyrene, ethylene - p - methylstyrene, propylene-o-chlorostyrene, butene-1-styrene, isobutylene-p-isopropylstyrene, ethylene-o-chloro-p-methylstyrene, and propylene-m-ethylstyrene. These representative systems of comonomers yield high molecular weight copolymers in the presence of aluminum chlorofluorides as catalysts.

In practicing my invention I have found that inert diluents can be used, if desired, for the polymerization of various monomers. The diluent has some utility in controlling the rate and temperature of reaction, and it tends to prevent the deposition of solid polymer on the surface of the catalyst and on the stirring apparatus and walls of the reactor. Inert diluents are useful in separating the desired polymer from the catalyst during the product isolation step. Saturated aliphatic hydrocarbons, for example, hexane, octane, nonane, decane, etc., and aromatic compounds e.g., benzene, toluene, xylenes, etc., can be utilized as inert diluents.

Besides the inert liquid diluent used as a dispersant in the reactor, it may be advantageous to use an inert diluent for the addition of the monomer to the polymerization reactor. Lower molecular weight saturated hydrocarbons, for example, ethane, propane, and butane have been used successfully.

The aluminum chlorofluorides are reactive polymerization catalysts over a wide range of temperatures and pressures. Conditions of temperature and pressure, as well as reaction time, are determined by considerations of factors such as the monomer or monomer mixture used, the type and percentage of diluent used, and the amount of co-catalyst used. In the polymerization of ethylene, for example, solid high molecular weight polyethylene has been prepared by my invention both at room temperature, and at temperatures of 100° and higher. I have demonstrated that a co-catalyst can be used with aluminum chlorofluoride to modify the reaction temperature and the reaction time necessary to prepare solid polymer from ethylene.

Aluminum chlorofluoride catalysts of this invention are operable as polymerization catalysts at temperatures as low as $-100°$ C. and at temperatures up to about 250° C. It is an added advantage of this invention that the catalyst is not dependent upon a narrow temperature range for successful utility. Likewise, I have demonstrated that the catalysts of my invention are independent of pressure for their adaptation. However, operation under superatmospheric pressure may be desirable to achieve economical reaction rates for commercial manufacture, and in certain cases normally gaseous monomers are more conveniently handled in a superatmospheric pressure system. The aluminum chlorofluorides are active catalysts at superatmospheric pressure and can be used successfully under such conditions.

While the aluminum chlorofluoride catalysts of this invention have been shown to have particular utility as polymerization catalysts, they are also suitable for use in other types of reactions where Friedel-Crafts catalysts are useful. Aluminum chlorofluorides can be used as catalysts for the alkylation of aromatic compounds with aliphatic olefins, alkyl halides, or aliphatic alcohols. These catalyst compositions can also be used in reactions of acid chlorides or acid anhydrides with aromatic compounds to synthesize ketones. In general these catalysts can be utilized in any Friedel-Crafts type reaction and are advantageous in that they induce less side reactions than aluminum chloride. I have found that these catalysts can also be used as isomerization catalysts and as disproportionation catalysts.

The practice of my invention is not limited to intermittent or batch-type operation. The catalysts described herein can be deposited on an inert carrier, e.g., alumina, carbon, silica, or asbestos or mixtures thereof and the monomer, diluted with an inert diluent if desired, passed over the catalyst. If desired, the catalyst suspended in an inert diluent can be fed concomitantly with the monomer into the polymerization chamber. Other aspects of continuous operation will be obvious to those skilled in the art. For example, since one form of preferred catalyst is a fine powder that flows like a liquid, the polymerization reactor can be modified so that catalyst and monomer can be fed concomitantly into the reactor containing an inert hydrocarbon liquid as diluent.

In order to illustrate some of the various aspects of the invention and to serve as a guide in applying the invention, the following specific examples are given. It will, of course, be understood that variations from the particular temperatures, pressures, diluents and proportions can be made without departing from the invention.

*Example 1*

In this example the weight of reactants was adjusted to yield a product containing 37.8% by weight fluoride and 73.1% by weight total halide, thus calculated to contain 51.7% fluoride based on the total halide content.

A 1500 ml. glass reactor was charged with 23.3 g. anhydrous $AlCl_3$ powder and 700 g. ethyl chloride. The $AlCl_3$ slowly dissolved at the boiling point of ethyl chloride. Trace quantities of insoluble material were filtered off and the clear solution was then cooled to $-78°$ C., at which temperature 8.1 g. anhydrous $BF_3$ was added. The solution was slowly warmed to 0° C. and maintained at this temperature for 2 hours. The solution gradually became viscous and the thickening process continued until a gel was obtained. Volatile components were distilled from the reactor under reduced pressure and the product was stored under an applied vacuum of an oil pump (0.1 mm./Hg) for 20 hours. The weight of catalyst obtained was 17.45 g., corresponding to the conversion of $AlCl_3$ to $AlClF_2$ according to the equation:

$$3AlCl_3 + 2BF_3 \rightarrow 3AlClF_2 + 2BCl_3\uparrow$$

*Example 2*

In this example the weight of reactants was predetermined so that a product would be obtained of about 26.3% by weight fluoride and 76.3% by weight total halide content. This product would then have 34.4% fluoride based on the total halide content.

A small autoclave was cooled and then charged with 16 g. anhydrous $AlCl_3$ powder and 160 g. ethyl chloride and sealed. The $AlCl_3$ was dissolved by shaking the autoclave at 45° C. An addition of 5.0 g. anhydrous $BF_3$ was made and shaking continued to promote reaction. Volatile materials, solvent and by-product $BCl_3$ were distilled from the product under reduced pressure derived from a vacuum pump. The catalyst obtained was a mixture of materials obtained according to the following equations:

$$3AlCl_3 + 2BF_3 \rightarrow 3AlClF_2 + 2BCl_3 \uparrow$$
$$3AlCl_3 + BF_3 \rightarrow 3AlCl_2F + BCl_3 \uparrow$$

The formula for this catalyst composition thus may be written as $Al_2Cl_3F_3$, $AlCl_3 \cdot AlF_3$, or $AlClF_2 \cdot AlCl_2F$.

*Example 3*

The catalyst prepared according to Example 2 was tested for activity without withdrawing it from the autoclave and without exposing it to air. Dry, low-boiling kerosene, 150 ml., was drawn into the evacuated autoclave and then ethylene added to produce a pressure of 100 p.s.i. The autoclave was shaken by a rocking mechanism for 2 hours at room temperature and then heated at 75° C. for one hour. The autoclave was cooled and vented to the atmosphere. The kerosene layer was observed to be clear, colorless, and essentially free of polymer. The catalyst, in granule form, was coated with very high molecular weight polymer. The catalyst was dissolved in aqueous HCl and the polymer washed with methanol, water, and then dried. The high molecular weight polyethylene obtained required molding temperatures in excess of 180° C. to flow.

*Example 4*

Catalyst prepared according to the procedure of Example 1, namely 0.5 g. of $AlClF_2$, was added to a small reactor together wtih 15 ml. of cyclopentene. The reactor was sealed and stored for 72 hours at room temperature. At the end of this interval an appreciable amount of a mixture of solid and oily polymer was obtained.

*Example 5*

Catalyst from the procedure according to Example 1, 0.5 g., $AlClF_2$, was added to 15 ml. of styrene monomer and the reactor sealed. After 72 hours storage at room temperature, a quantity of polymeric material, completely soluble in acetone, was obtained.

*Example 6*

In a qualitative run similar to Example 5, 0.5 g. of $AlClF_2$ was added to 15 ml. of bicycloheptadiene, the reactor was sealed and stored for 72 hours at room temperature. Trace quantities of solid polymer were obtained under these conditions.

*Example 7*

The following procedure was used to prepare an aluminum chlorofluoride catalyst having the calculated composition of 26.2% fluoride, 76.3% total halide and thus 34.4% fluoride based on total halide content.

A charge of 50 g. of aluminum chloride was mixed in 1100 ml. ethyl chloride maintained at reflux until essentially all of the aluminum chloride had dissolved. The solution was filtered and ethylidene fluoride, $CH_3CHF_2$, was added at 0° to 12° C., to convert the aluminum chloride to a mixture of $AlClF_2$ and $AlCl_2F$. As halogen interchange took place the solution increased appreciably in viscosity due to gel formation, as the fluorine-containing catalyst was precipitated. This gel was stored at −78° C. as a stock solution. While the exact formula of this composition is not known, the material can have the structure calculated to be $AlCl_3 \cdot AlF_3$, $Al_2Cl_3F_3$, or $AlClF_2 \cdot AlCl_2F$. The formula assigned to this product is not critical nor necessary to its successful utilization.

*Example 8*

Into a small reactor was charged 25 ml. of the catalyst prepared in Example 7 in its gel like form. This gel was cooled to −78° C. and liquid isobutylene added. Polymerization proceeded rapidly and a tough rubbery polyisobutylene was obtained.

*Example 9*

An aliquot of the catalyst prepared in Example 7 was filtered and the clear filtrate added to a small reactor and cooled to −78° C. When isobutylene was added to this solution no polymerization took place even after one day of storage at this temperature. This example indicates that the polymerization reaction proceeds by heterogeneous catalysis, and that there is no active catalyst of my invention in solution.

*Example 10*

Into a small reactor was charged 50 ml. isobutylene and 1 ml. isoprene with a quantity of crushed Dry Ice. Catalyst gel, prepared in Example 7, 25 ml. was then added and the reactants mixed thoroughly. Polymer formed almost instantly and separated in slurry form.

*Example 11*

A charge of 15 ml. of isobutylene, 15 ml. styrene, and 50 ml. of ethyl chloride was mixed with crushed Dry Ice and 25 ml. of the catalyst gel from Example 7 was added while mixing thoroughly. A slurry of the copolymer separated almost instantly.

*Example 12*

A small glass reactor was charged with 15 ml. isoprene monomer and a quantity of crushed Dry Ice. While mixing, 25 ml. of the catalyst gel from Example 7 was added. The isoprene polymer was formed rapidly as a mixture of very tacky solid and oil.

*Example 13*

To 100 ml. of dry isooctane was added 25 ml. of the catalyst gel from Example 7, and the resulting mixture was warmed to room temperature. The ethyl chloride boiled off leaving a very fine suspension of aluminum chlorofluoride catalyst. This catalyst suspension was effective in polymerizing isobutylene and also styrene to solid polymers at room temperature and atmospheric pressure.

*Example 14*

To a solution of 5 ml. bicycloheptadiene in 20 ml. of octane at room temperature was added 10 ml. of the catalyst prepared in Example 7. After mixing for a few minutes a slurry of polymer separated out. This polymer was washed free of catalyst with methanolic HCl, and there was obtained a high molecular weight solid, insoluble in kerosene and hexane.

*Example 15*

The procedure of Example 14 was repeated using 5 ml. of isoprene as the sole monomer. Solid polymer of isoprene was obtained within a few minutes.

*Example 16*

A solution of 5 ml. bicycloheptadiene and 5 ml. isoprene in 20 ml. isooctane was cooled to −78° C. and 10 ml. of the catalyst from Example 7 was added. The product obtained by washing away the catalyst with methanolic HCl was a high molecular weight copolymer insoluble in hot xylene, kerosene and hexane.

*Example 17*

A mixture of 5 ml. of isoprene and 50 ml. propylene was cooled to −78° C. and 25 ml. of the catalyst from Example 7 was added. The mixture was held at −78° C. for three hours and then allowed to slowly warm to room temperature. The volatile constituents were evaporated and the product remaining was washed with methanol to obtain a tacky-solid. This solid was dissolved in octene, filtered and the octene evaporated to obtain a clear tacky film having properties of synthetic drying oil. This film "dried" to a hydrocarbon-insoluble film after standing 72 hours at room temperature.

*Example 18*

Anhydrous $AlCl_3$, 23 g., was dissolved in 700 ml. boiling ethyl chloride and the solution filtered. The solution was cooled to $-78°$ C. and 5 ml. $TiCl_4$ added followed by 8 g. $BF_3$. The clear light-yellow solution was then warmed to the boiling point of ethyl chloride to initiate the reaction between $AlCl_3$ and $BF_3$. The reaction mixture was then stored at 0° C. for 4 hours to permit the reaction to proceed to completion. The volatile components were then evaporated under reduced pressure. The catalyst so prepared weighed 22.0 g. and fumed on exposure to air.

*Example 19*

Into a small autoclave was charged 3 g. of the catalyst prepared in Example 18, 25 ml. hexane, and ethylene to obtain a pressure of 200 p.s.i. at room temperature. The autoclave was sealed and held at room temperature for one hour. Excess ethylene was then vented and the autoclave opened. The catalyst was covered with solid high molecular weight polyethylene.

*Example 20*

An aluminum chlorofluoride composition was designed to contain 47.8% fluoride, based on the total halide content, by the procedure of this example.

A clear solution was prepared by dissolving 50 g. $AlCl_3$ in 1100 ml. boiling ethyl chloride. This solution was cooled to 0° C. and $BF_3$ introduced slowly with vigorous agitation until 16 g. had been added. Within a few minutes a gel was formed. To this gel was then added 5 ml. $TiCl_4$ with vigorous mixing to effect dispersion. The volatile components were then evaporated under reduced pressure to obtain a finely divided powder weighing 46.3 g. The yield agrees stoichiometrically with the initial calculations for 47.8% fluoride, based on total halide content of the aluminum chlorofluoride.

*Example 21*

A small autoclave was charged with 4 g. of the catalyst prepared in Example 20 along with 25 ml. hexane as diluent. The autoclave was then pressurized with ethylene over a 30 minute period to 800 p.s.i. at room temperature. The autoclave was then warmed to 50° C. and held at 50° C. for 30 minutes. When the autoclave was cooled and vented the catalyst was heavily coated with a solid high molecular weight polyethylene.

*Example 22*

A 1-liter autoclave equipped with a mechanical stirring apparatus was charged with 35 g. of catalyst prepared in Example 20 along with 300 ml. dry hexane. The autoclave was then pressurized with ethylene to 600 p.s.i. at 40° C. A 10 degree rise in temperature took place almost instantly. External heating was then applied to bring the internal temperature to 80° C. at which temperature the pressure was 715 p.s.i. After one hour at 80° C. the pressure had dropped to 580 p.s.i. The autoclave was then coled and vented and found to contain a free flowing polymer slurry. Extraction of the catalyst with dilute hydrochloric acid and isobutanol yielded the product polymer. The polyethylene prepared in this example had a density of 0.933. Its yield and break strength were both over 3000 p.s.i.

*Example 23*

Into a small test autoclave was charged 2.0 g. $AlClF_2$, 25 ml. hexane, 0.8 ml. $TiCl_4$ and ethylene to a pressure of 300 p.s.i. at room temperature. The autoclave was held at room temperature for 16 hours and then heated to 100° and held at this temperature for one hour. After cooling, the autoclave was vented and found to contain solid polyethylene of high molecular weight.

*Example 24*

A small test autoclave was charged with 2 g. $AlClF_2$, 25 ml. hexane, 0.8 ml. $TiCl_4$ and ethylene to a pressure of 300 p.s.i. at room temperature. The autoclave was then heated to 80°, held at 80° for two hours and then permitted to slowly cool to room temperature. After the autoclave was vented and opened a solid polyethylene of high molecular weight was isolated from the catalyst.

While the invention has been described with particulary reference to preferred embodiments thereof, it will be appreciated that variations from the details given herein can be effected without departing from the invention in its broadest aspects.

I claim:

1. The process of polymerizing ethylene to solid high molecular weight polymer which comprises contacting ethylene with an aluminum chlorofluoride catalyst having a fluoride content of 9.7% to 72.8% based on the total halide content of said aluminum chlorofluoride.

2. In the process of polymerizing ethylene to high molecular weight polymer at temperatures from about 0° C. to about 120° C., the improvement which comprises contacting ethylene with a catalyst composition consisting essentially of one part aluminum chlorofluoride having a fluoride content of 9.7% to 72.8% based on the halide content of said aluminum chlorofluoride and from 0.1 to 10.0 parts by weight of a co-catalyst selected from the group consisting of antimony pentachloride, antimony trichloride, tin tetrachloride, titanium tetrachloride, titanium trichloride, silicon tetrachloride, ferric chloride, aluminum bromide, chromium trichloride, zirconium tetrachloride, and zinc chloride in the presence of a liquid inert diluent.

3. Process according to claim 2 in which the co-catalyst is titanium tetrachloride.

4. Process according to claim 2 in which the aluminum chlorofluoride has a fluoride content of 20% to 52% based on the halide content of said aluminum chlorofluoride.

5. Process according to claim 4 in which the aluminum chlorofluoride has a molecular formula corresponding to $AlClF_2$.

References Cited in the file of this patent

UNITED STATES PATENTS

| | | |
|---|---|---|
| 2,311,232 | Ipatieff et al. | Feb. 16, 1943 |
| 2,481,273 | Young | Sept. 6, 1949 |
| 2,637,720 | Schneider | May 5, 1953 |
| 2,733,219 | Bloch | Jan. 31, 1956 |
| 2,834,769 | Feller et al. | May 13, 1958 |
| 2,839,518 | Brebner | June 17, 1958 |

FOREIGN PATENTS

| | | |
|---|---|---|
| 554,096 | Great Britain | June 21, 1943 |
| 587,395 | Great Britain | Apr. 24, 1947 |
| 1,007,999 | Germany | May 9, 1957 |